United States Patent [19]

Rifkin

[11] Patent Number: 5,692,956
[45] Date of Patent: Dec. 2, 1997

[54] COMBINATION COMPUTER MOUSE AND GAME PLAY CONTROL

[75] Inventor: Andrew Rifkin, Palos Verdes, Calif.

[73] Assignee: Mattel, Inc., El Segundo, Calif.

[21] Appl. No.: 599,218

[22] Filed: Feb. 9, 1996

[51] Int. Cl.⁶ ............................................. A63B 9/00
[52] U.S. Cl. ...................... 463/37; 345/163; D14/114
[58] Field of Search ........................ 463/36, 37, 47; 345/163, 157, 156; D14/114

[56] References Cited

U.S. PATENT DOCUMENTS

| | | | |
|---|---|---|---|
| D. 361,558 | 8/1995 | Siano, Jr. | D14/114 |
| D. 361,559 | 8/1995 | Siano, Jr. | D14/114 |
| D. 362,242 | 9/1995 | Siano, Jr. | D14/114 |
| D. 370,219 | 5/1996 | Blumer et al. | D14/114 |
| 3,541,541 | 11/1970 | Engelbart | 345/156 |
| 3,835,464 | 9/1974 | Rider | 345/164 |
| 4,859,995 | 8/1989 | Hansen et al. | 345/163 |
| 4,862,165 | 8/1989 | Gart | 345/163 |
| 5,186,629 | 2/1993 | Rohen | 345/163 |
| 5,245,146 | 9/1993 | Florence | D14/114 |
| 5,296,871 | 3/1994 | Paley | 345/163 |
| 5,351,677 | 10/1994 | Kami et al. | 364/413.13 |

*Primary Examiner*—Jessica Harrison
*Assistant Examiner*—James Schaaf
*Attorney, Agent, or Firm*—Roy A. Ekstrand

[57] ABSTRACT

A computer mouse supports a body configured to replicate a miniature automotive vehicle. The vehicle body includes a pair of push buttons for right and left operation. The mouse further includes a conventional trackball unit together with conventional right and left click switches. A selector switch supported upon the vehicle body configures the game play control for operation as a conventional computer mouse or a game play control unit. In the game play control position, a vibrating motor and sound system are operative to provide vehicle sounds and vibrations.

1 Claim, 2 Drawing Sheets

5,692,956

COMBINATION COMPUTER MOUSE AND GAME PLAY CONTROL

FIELD OF THE INVENTION

This invention relates generally to computer game systems and particularly to control input devices used in game play.

BACKGROUND OF THE INVENTION

Computer games have enjoyed great popularity through the years with both children and adults. As computer systems have increased in computing power and decreased in proportional price, computer games have become correspondingly more intricate and sophisticated. The display quality for such computer games has substantially improved providing near life-like display resolution and quality. Among the variety of computer games which have become very popular is the type known generally as driving or roadway type games. Such games vary substantially but generally all provide a display which depicts the scene in front of a simulated traveling vehicle such as a race car, airplane, or the like. Substantial game play realism is provided by the computer's capability of scrolling or moving the displayed image in response to control inputs from the user. Thus, for example, in depicting a race car traveling upon a roadway, the computer is able to process simulated control inputs from the game player such as left turn or right turn by displacing or scrolling the displayed image correspondingly. Additional sophistication provides for changes in speed of the forward direction scrolling of the display in response to acceleration and braking input commands. The instruction set which forms the game itself is typically stored within a replaceable memory such as a computer disk or, alternatively, is stored upon a higher capacity device such as a CD-ROM. In either case, appropriate drives within the computer processor unit receiver the disk or CD-ROM and retrieve the necessary data and information from the disk to facilitate game play and image display.

Because such games are played upon an otherwise conventional computer, the user input is usually achieved via the computer keyboard or the computer mouse in a process in which the user understands the correlation between particular keys of the keyboard or mouse operation and the game play. Alternatively, however, practitioners have provided special purpose input devices such as joystick controllers or the like to enhance the realism and game play amusement. Such units are often expensive and less than satisfactory in their performance.

While computer games generally have very effectively utilized the computer's capabilities in providing exciting and amusing games, the input controller system used remains less than satisfactory in many computer games. One reason for this lack of satisfaction is found in the difficulty of the user in associating the keyboard or mouse with the corresponding performance functions of the game play.

There remains therefore a continuing need in the art for evermore improved game play controllers for use in computer games.

SUMMARY OF THE INVENTION

Accordingly is a general object of the present invention to provide an improved game play control. It is a more particular object of the present invention to provide an improved game play control which possesses an understandable association with the game being played and which maintains the capability to function as a generalized computer input device.

In accordance with the present invention, there is provided for use in combination with a computing system having a processor unit, a memory, and a display, a game play control comprising: a computer mouse having a pair of click switches and a trackball unit; a simulated toy vehicle body supported upon the computer mouse having a pair of movable button portions overlying the pair of click switches; a pair of head lights and a pair of tail lights supported by the body; a vibrator supported by the body; an analog switch interposed between one of the movable button portions and one of the click switches; and a mode switch coupled to the computer mouse for operating the game play control in either a computer mouse mode or a game play mode.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
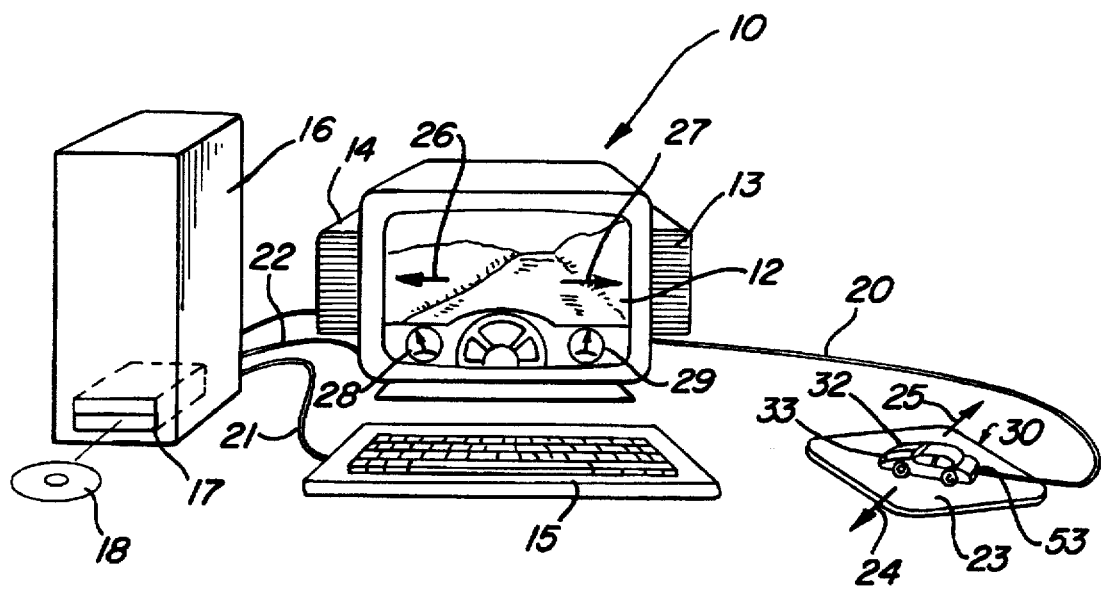
FIG. 1 sets forth a perspective view of a typical computer system utilizing a combination computer mouse and game play control constructed in accordance with the present invention.

FIG. 1 sets forth a perspective view of a conventional computing system generally referenced by numeral 10 having a combination computer mouse and game play control constructed in accordance with the present invention and generally referenced by numeral 30 coupled thereto. Computing system 10 includes a conventional monitor 11 having a display screen 12 and a pair of speakers 13 and 14. Computing system 10 further includes a processor unit 16 having a CD-ROM drive 17 supported therein. In accordance with conventional fabrication techniques, CD-ROM drive 17 receives a CD-ROM 18 which provides game play data to processor 16. Computing system 10 further includes a conventional keyboard 15. As is seen in FIG. 1, processor 16 is operatively coupled to monitor 11 by a connecting cable 22 and to keyboard 15 by a connecting cable 21. In addition, processor unit 16 is coupled to game play control 30. Game play control 30 is supported upon a conventional mouse pad 23.

In operation and in accordance with conventional game play techniques, a plurality of game play instructions are stored upon CD-ROM 18 which is then placed within CD-ROM drive 17 of processor unit 16. As processor unit 16 reads the data from CD-ROM 18, the processor unit configures display 12 of monitor 11 and prepares for game play.

Thus, processor 16 and monitor 11 should be understood to perform in accordance with conventional computer operation to provide game play operation in the form of managing the image displayed upon display surface 12 and the sounds produced at speakers 13 and 14.

In accordance with the present invention and as is described below in greater detail, game play control 30 is a combination computer mouse and game play control and thus is operative in either a computer mouse mode or a game play mode. The mode of operation of game play control 30 is selected by switch 53 supported upon the rearmost portion of game play control 30. In accordance with the present invention, game play control 30 is configured to resemble a miniature automobile and, accordingly, the image depicted upon display 12 and the game played by processor 16 in response to CD-ROM 18 corresponds to a road race type game or other game associated with the automobile appearance of game play control 30.

During game play and in accordance with an important aspect of the present invention, the user places switch 53 in the game play mode which communicates to processor 16 via cable 20 that game play control 30 is not functioning as a standard computer mouse but rather is functioning as a game play control.

The structure of game play control 30 is set forth below in FIGS. 2 and 3 in greater detail. However, suffice it to note here that game play control unit 30 includes a conventional trackball unit on its underside resting upon mousepad 23. In addition, game play control 30 supports a right button 32 and a left button 33 formed as respective right and left portions of the hood of vehicle body 31 (better seen in FIG. 2).

During game play operation, movements to the left in the direction of arrow 24 or to the right in the direction of arrow 25 of game play control 30 are communicated by the trackball unit on the underside of game play control 30 (seen in FIG. 3) to cause display scrolling in the directions indicated by arrows 26 and 27 upon display screen 12. This facilitates game play in which the user "steers" the simulated vehicle viewed on display 12 by moving game play control unit 30 to the left and to the right. In addition, depressing right push button 32 communicates game play information to processor 16 corresponding to depressing the accelerator in a vehicle. In response and by means set forth below in greater detail, game play control 30 is caused to vibrate simulating engine vibration and communicates to processor 16 the acceleration which in turn produces output sounds played through speakers 13 and 14 corresponding to engine noise. In addition, a pair of simulated gages 28 and 29 which represent a tachometer and speedometer of the simulated vehicle respectively also respond to the pressure exerted upon right push button 32. Thus, the combined effect observed by the game player in depressing right button 32 is the increase in vehicle speed, the increase in engine RPM, an increase in tactile vibration felt in the game play control and a rise in the engine noise pitch produced through the sound system of computer system 10.

In addition, as the user depresses push button 33 of game play control 30, a braking action is simulated and the image upon display 12 responds accordingly to depict a slower speed with reduced scrolling in the forward direction. In addition, the pressing of button 33 communicates to processor 16 an appropriate command which causes processor 16 to cause sounds representative of brake screeching to be outputted through the computer sound system. Thus, as the game player releases button 32 and presses button 33, the front to back scrolling of the image upon display 12 slows and the sound of brake screeching is heard.

Figure 2:
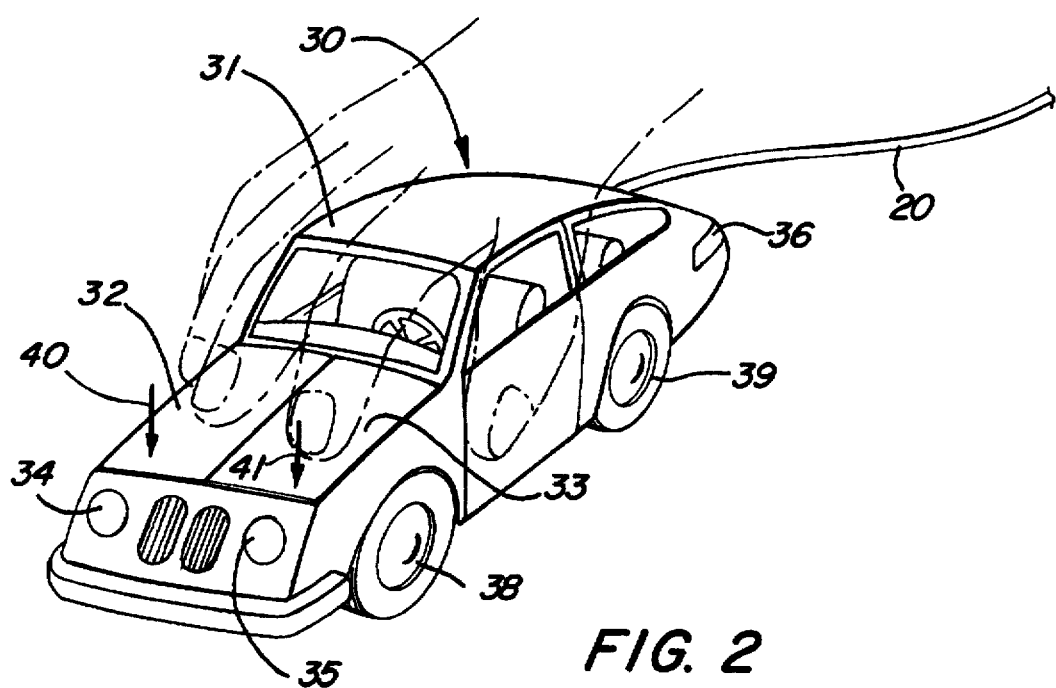
FIG. 2 sets forth an enlarged perspective view of the present invention combination computer mouse and game play control.

FIG. 2 sets forth a front perspective view of game play control 30 which as described above comprises a combination computer mouse and game play control. Mouse 30 includes an automotive body 31 having a frontal hood portion within which a depressible right button 32 is supported and a depressible left button 33 is also supported. In addition, body 31 supports a pair of head light lenses 34 and 35 and a pair of tail light lenses 36 and 37 (the latter seen in FIG. 3). Body 31 further supports a plurality of simulated wheels such as wheels 38 and 39. A cable 20 couples the apparatus within mouse 30 seen in FIG. 3 to processor 16.

In accordance with the present invention, the user places a hand upon the upper portion of body 31 in the manner shown in dashed-line representation such that the user's thumb extends downwardly along the left side and the user's fingers extend downwardly to right button 32 and left button 33. When so gripped, the user is able to move game play control 30 from side to side to provide the above-described directional command input or to press either of buttons 32 or 33 to manipulate the above-described game play of acceleration and braking respectively. Thus, as the user forces button 32 downwardly in the direction of arrow 40, an increasingly greater acceleration command is communicated to processor 16 via cable 20. Correspondingly, when the user presses left button 33 downwardly in the direction of arrow 41, the above described braking action commands are coupled to processor unit 16.

Figure 3:
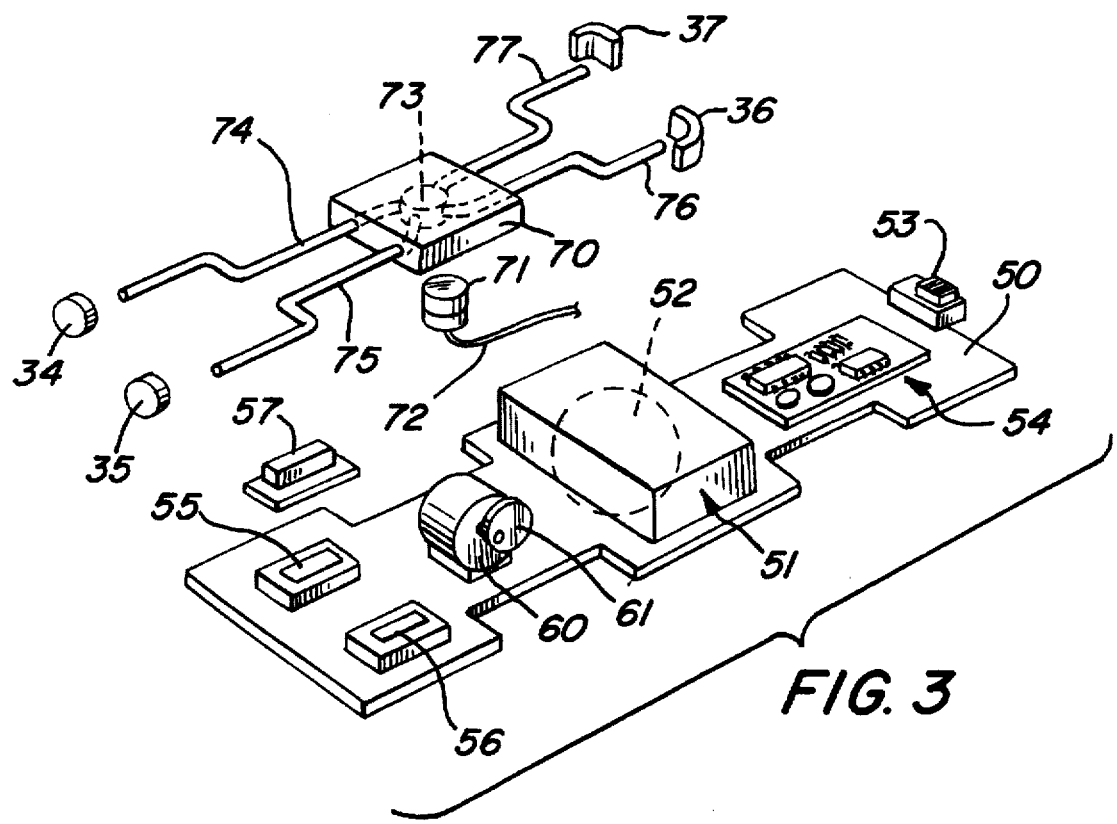
FIG. 3 sets forth a perspective assembly view of the present invention combination computer mouse and game play control having the outer body portion removed therefrom.

FIG. 3 sets forth a perspective assembly view of the present invention game play control having body 31 removed together with wheels 38, 39 and the remaining wheels. Game play control 30 includes a support chassis 50 having a circuit 54 supported thereon. Chassis 50 further supports a mode switch 53 which is operative to select game play or conventional mouse operation for control 30. A conventional trackball unit 51 having a conventional trackball 52 is supported at the midportion of chassis 50. In further accordance with the present invention, an electric motor 60 supports an eccentric weight 61. The function of motor 60 and weight 61 is to provide vibration of chassis 50 in the above-described engine vibration simulation. To facilitate conventional mouse operation, chassis 50 supports a right click switch 55 and a left click switch 56. In addition, to facilitate the above-described accelerator simulation, game play control 30 further includes an analog switch 57 which is coupled in tandem to click switch 55.

A housing 70 defines a recess 73 within which a light emitting diode 71 is received. Diode 71 is coupled by a conventional wiring set 72 to a source of power on circuit 54 (not shown). A plurality of light pipes 74, 75, 76 and 77 couple the light energy produced by LED 71 to a pair of head light lenses 34 and 35 and a pair of tail light lenses 36 and 37. In accordance with an important aspect of the present invention, the movement of mode switch 53 to the game play position energizes light emitting diode 71 producing light which illuminates headlight lenses 34 and 35 as well as tail light lenses 36 and 37.

In further accordance with the present invention, the placing of mode select switch 53 in the mouse position deactivates analog switch 57, motor 60 and light emitting diode 71. As a result, control 30 operates in response to right click switch 55 and left click switch 56 as hood portions 32 and 33 (seen in FIG. 2) are pressed. Trackball unit 51 provides conventional mouse operation when mode switch 53 is set to the mouse position.

Figure 4:
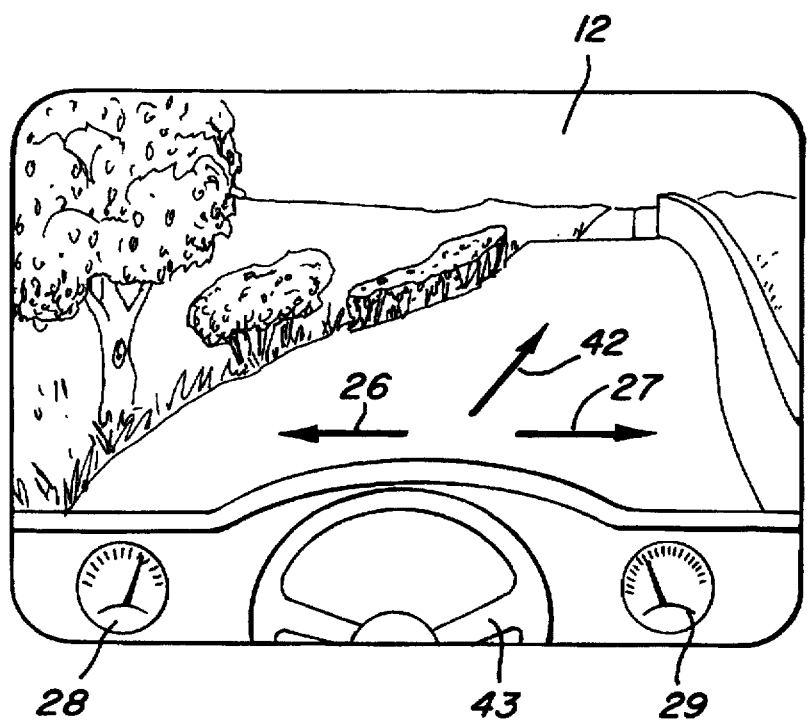
FIG. 4 sets forth an illustrative monitor display for a computer game utilizing the present invention combination computer mouse and game play control.

FIG. 4 sets forth an enlarged view of display screen 12 showing simulating tachometer 28 and simulated speedometer 29. The image formed upon display screen 12 further includes a steering wheel depiction 43 and a typical road scene. In accordance with the present invention, movement of game play control unit to the right or left causes scrolling of the depicted image in the directions indicated by arrows 26 and 27 respectively. Further, the image is scrolled in the forward direction shown by arrow 42 in response to actuation of accelerator button 32 or braking button 33.

What has been shown is a combination computer mouse and game play control which facilitates operation as a standard computer mouse and which provides a novel game play control for use in playing a simulated automotive game.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in combination with a computing system having a processor unit, a memory, and a display, a game play control comprising:

a computer mouse having a pair of click switches and a trackball unit;

a simulated toy vehicle body supported upon said computer mouse having a pair of movable button portions overlying said pair of click switches;

a pair of head lights and a pair of tail lights supported by said body;

a vibrator supported by said body;

an analog switch interposed between one of said movable button portions and one of said click switches; and a mode switch coupled to said computer mouse for operating said game play control in either a computer mouse mode or a game play mode, wherein in said computer mouse mode said vibrator and said head lights and tail lights are disabled.

* * * * *